United States Patent
Suen

(10) Patent No.: US 8,849,011 B2
(45) Date of Patent: Sep. 30, 2014

(54) VIDEO PROCESSING SYSTEM AND METHOD THEREOF FOR COMPENSATING BOUNDARY OF IMAGE

(75) Inventor: Wei-Ting Suen, Fonghua Village (TW)

(73) Assignee: Himax Media Solutions, Inc., Tainan (TW)

( * ) Notice: Subject to any disclaimer, the term of this patent is extended or adjusted under 35 U.S.C. 154(b) by 995 days.

(21) Appl. No.: 12/899,807

(22) Filed: Oct. 7, 2010

(65) Prior Publication Data

US 2012/0087598 A1    Apr. 12, 2012

(51) Int. Cl.
G06K 9/00 (2006.01)
G06T 3/40 (2006.01)
H04N 13/00 (2006.01)

(52) U.S. Cl.
CPC .......... *G06T 3/4007* (2013.01); *H04N 13/0007* (2013.01)
USPC .............................. 382/154; 345/419; 348/42

(58) Field of Classification Search
USPC ............... 382/154; 356/12–21; 345/419, 427; 348/42
See application file for complete search history.

(56) References Cited

U.S. PATENT DOCUMENTS

| | | | | |
|---|---|---|---|---|
| 6,477,267 B1 * | 11/2002 | Richards | ........................ | 382/154 |
| 2002/0008906 A1 * | 1/2002 | Tomita | ........................ | 359/462 |
| 2003/0107645 A1 | 6/2003 | Yoon | | |
| 2003/0169918 A1 * | 9/2003 | Sogawa | ........................ | 382/154 |
| 2010/0097444 A1 * | 4/2010 | Lablans | ........................ | 348/46 |
| 2012/0182403 A1 * | 7/2012 | Lange | ............................ | 348/51 |

FOREIGN PATENT DOCUMENTS

TW    200935874 A    8/2009

OTHER PUBLICATIONS

English translation of abstract of TW 200935874 A (published Aug. 16, 2009).

* cited by examiner

*Primary Examiner* — Samir Ahmed
(74) *Attorney, Agent, or Firm* — McClure, Qualey & Rodack, LLP

(57) ABSTRACT

A method is used for compensating a boundary of an image, in which each scan line in the image is shifted by a corresponding line shift amount. The method determines a boundary region for the image and moves each pixel in a scan line from an original position to a new position within the boundary region, in which the new position is determined according to the width of the boundary region, the original position, and a line shift amount, and the scan line is shifted by the line shift amount. Then, the method interpolates at least one pixel into the scan line according to the moved pixels for generating a compensated image.

6 Claims, 6 Drawing Sheets

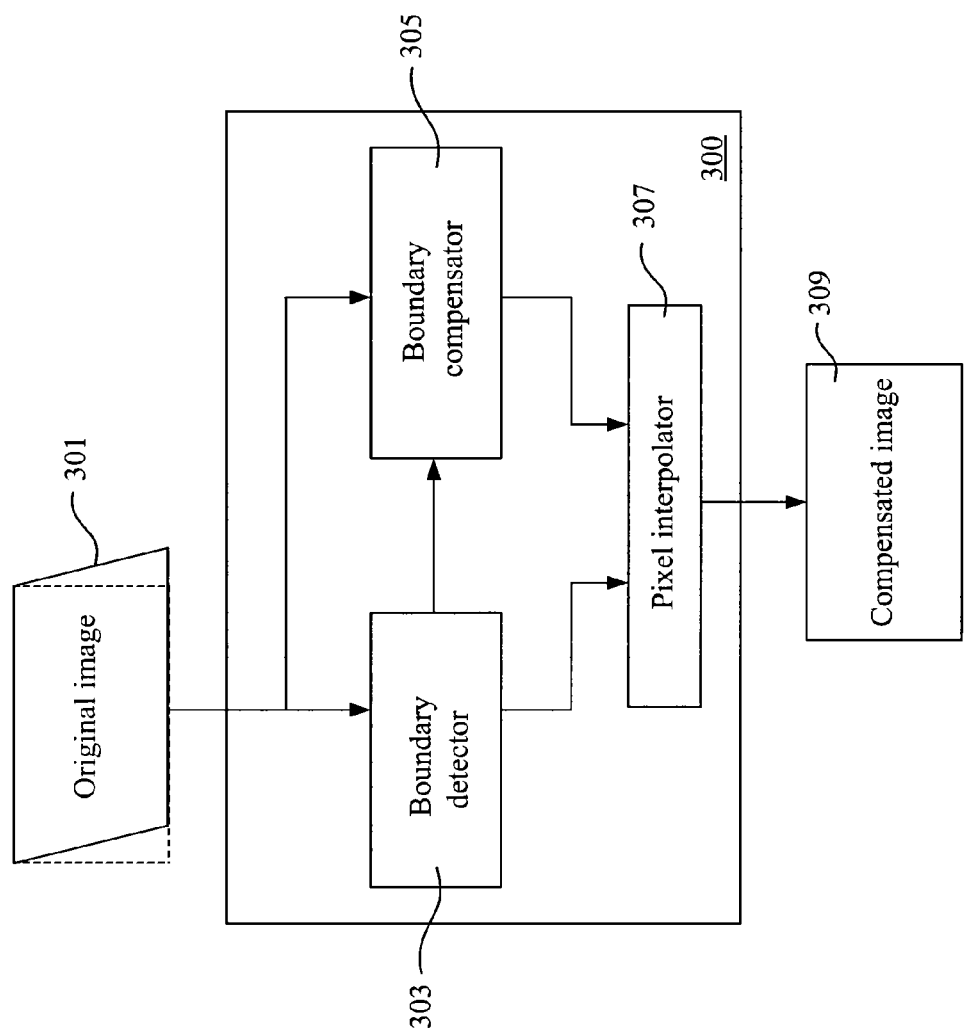

| 2D | 3D | 3D' | 3D" |
|---|---|---|---|
| 0 | 15 | 0 | 0 |
| 1 | 16 | 1.5 | 2 |
| 2 | 17 | 3 | 3 |
| 3 | 18 | 4.5 | 5 |
| 4 | 19 | 6 | 6 |
| 5 | 20 | 7.5 | 8 |
| 6 | 21 | 9 | 9 |
| 7 | 22 | 10.5 | 11 |
| 8 | 23 | 12 | 12 |
| 9 | 24 | 13.5 | 14 |
| 10 | 25 | 15 | 15 |
| 11 | 26 | 16.5 | 17 |
| 12 | 27 | 18 | 18 |
| 13 | 28 | 19.5 | 20 |
| 14 | 29 | 21 | 21 |
| 15 | 30 | 22.5 | 23 |
| 16 | 31 | 24 | 24 |
| 17 | 32 | 22.5 | 26 |
| 18 | 33 | 27 | 27 |
| 19 | 34 | 28.5 | 29 |
| 20 | 35 | 30 | 30 |
| 21 | 36 | 31.5 | 32 |
| 22 | 37 | 33 | 33 |
| 23 | 38 | 34.5 | 35 |
| 24 | 39 | 36 | 36 |
| 25 | 40 | 37.5 | 38 |
| 26 | 41 | 39 | 39 |
| 27 | 42 | 40.5 | 41 |
| 28 | 43 | 42 | 42 |
| 29 | 44 | 43.5 | 44 |

Fig. 4

VIDEO PROCESSING SYSTEM AND METHOD THEREOF FOR COMPENSATING BOUNDARY OF IMAGE

BACKGROUND

1. Field of Invention

The present invention relates to the video processing. More particularly, the present invention relates to the video processing of the three dimension (3D) image.

2. Description of Related Art

To meet the requirements for reproducing the natural images, the display technology has gradually changed from the two-dimensional displays to the three-dimensional displays. As early as Euclid and Aristotle's age, people noted that although there are two eyes receiving different images, people are prevented from the double image problems. After a lot of animal and human tests, the human brain's ability to reproduce the image's depth by receiving the images having different angles through the left eye and the right eye respectively has been proved.

The three-dimensional vision is formed because of the binocular parallax phenomenon, which is caused as a result of receiving images from different angles by the left eye and right eye. The images with different angles are merged to reproduce the three-dimensional images by the human brain. The three-dimensional image displaying technique includes the stereoscopic form and the auto-stereoscopic form. The stereoscopic form makes the user un-comfortable and therefore is not popular. On the other hand, the auto-stereoscopic form has become more and more popular.

FIG. 1 is an example which utilizes the right eye image and the left eye image to generate the three dimension image. At first the two dimension (2D) image may be analyzed to obtain depth information and then the left eye image and the right eye image are rendered by a depth image based rendering (DIBR) method referring to the 2D image and the depth information. In addition, the scan lines of the right eye image or the left eye image are shifted by a certain amount, which depends on the depth information, in order to create the image's depth.

However, the boundary region of the right eye image or the left eye image is destroyed due to the scan line shifting, which causes the whole three dimension image to be unpleasant to see. Therefore, there is a need for a new method and an apparatus which can compensate the boundary region of the images and reproduce the complete three dimension image.

SUMMARY

According to one embodiment of the present invention, a method used for compensating a boundary of an image is disclosed, in which each scan line in the image is shifted by a corresponding line shift amount. The method determines a boundary region for the image and moves each pixel in a scan line from an original position within the boundary region to a new position, in which the new position is determined according to the width of the boundary region, the original position, and a line shift amount, and the scan line is shifted by the line shift amount. Then, the method interpolates at least one pixel into the scan line according to the moved pixels for generating a compensated image.

According to another embodiment of the present invention, a video processing system for compensating a boundary of an image is disclosed, in which each scan line in the image is shifted by a corresponding line shift amount. The video processing system includes a boundary detector, a boundary compensator, and a pixel interpolator. The boundary detector determines a boundary region for the image. The boundary compensator moves each pixel in a scan line from an original position to a new position, in which the new position is determined according to the width of the boundary region, the original position, and a line shift amount, and the scan line is shifted by the line shift amount. The pixel interpolator interpolates at least one pixel into the scan line according to the moved pixels for generating a compensated image.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 3 shows the block diagram of the video processing system according to one embodiment of the present invention.

FIG. 4 shows a table to record the original positions and the new positions.

DESCRIPTION OF THE PREFERRED EMBODIMENTS

Figure 1:
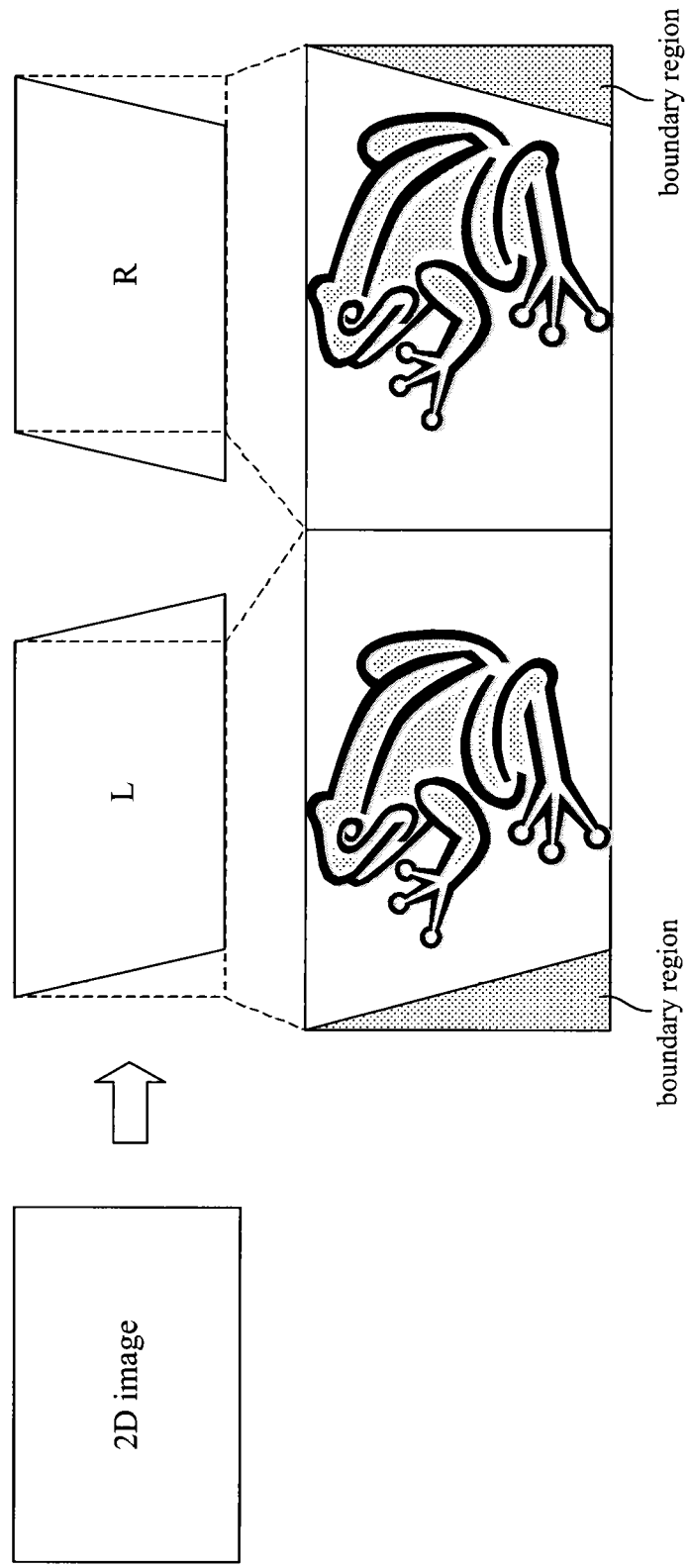
FIG. 1 shows the right eye image and the left eye image, which are generated according to a 2D image, for generating the three dimension image in a conventional way.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
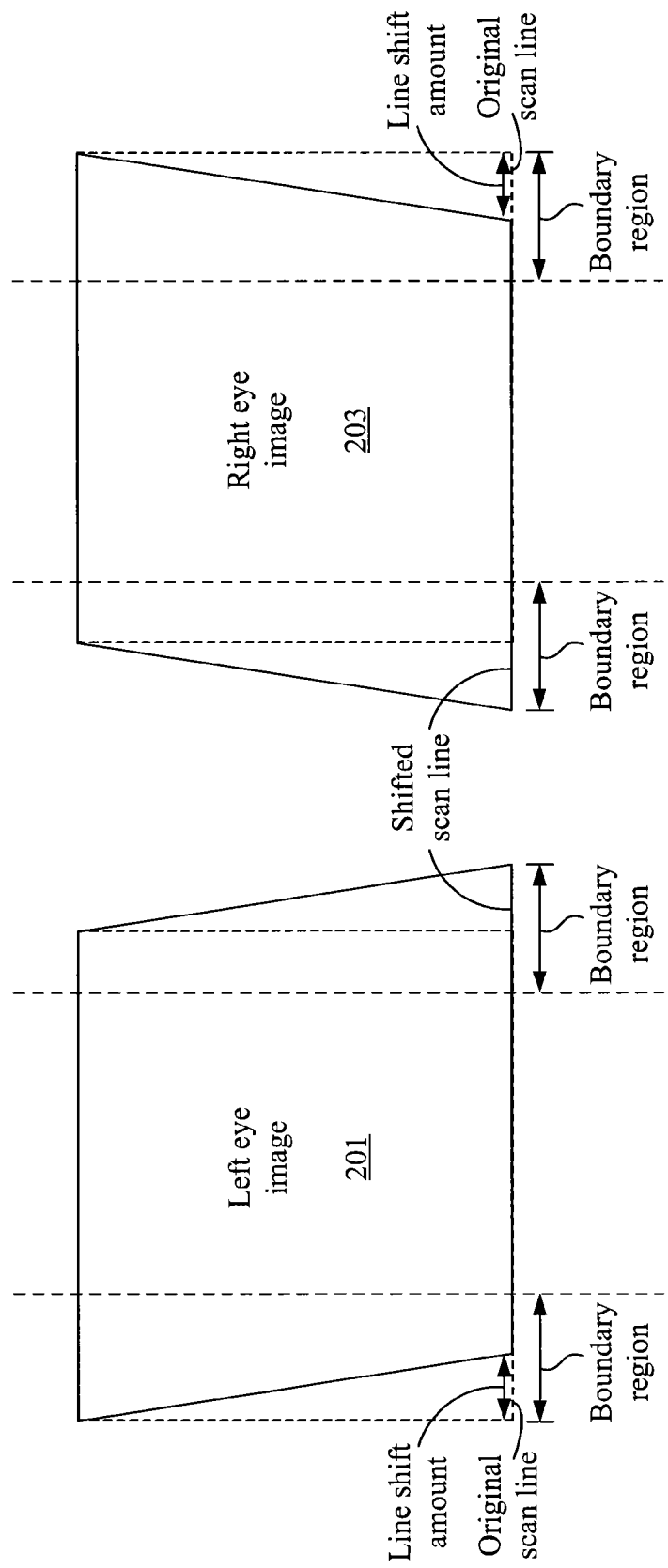
FIG. 2A shows the left eye image and the right eye image with the original scan line and the shifted scan line according to one embodiment of the present invention.
Figure 2B:
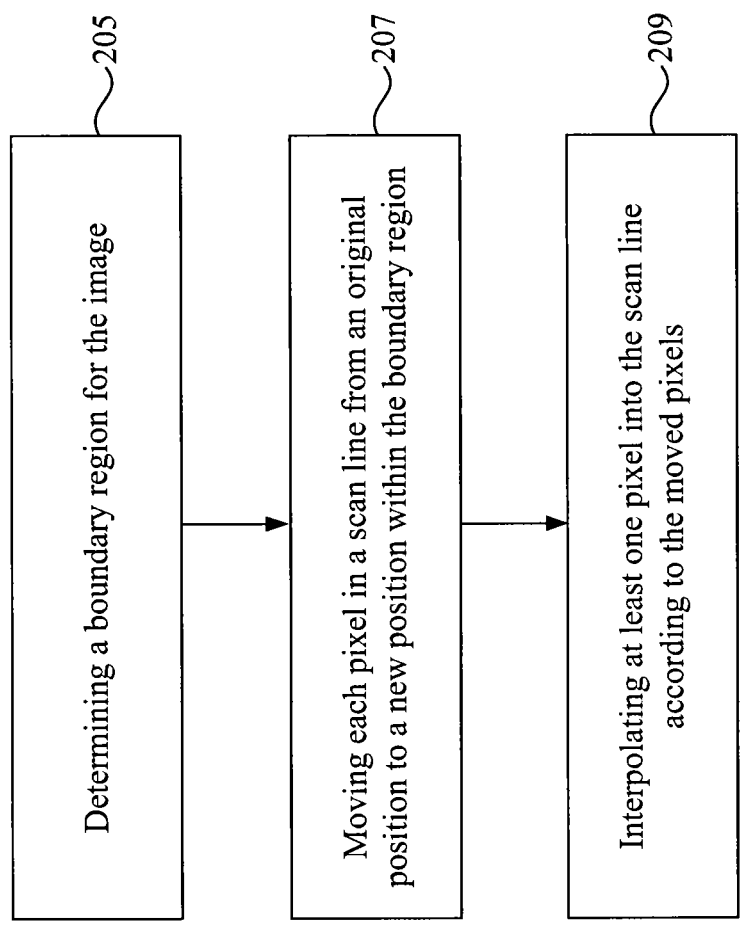
FIG. 2B shows the flow chart of the method for compensating a boundary of an image according to one embodiment of the present invention.
Figure 2C:
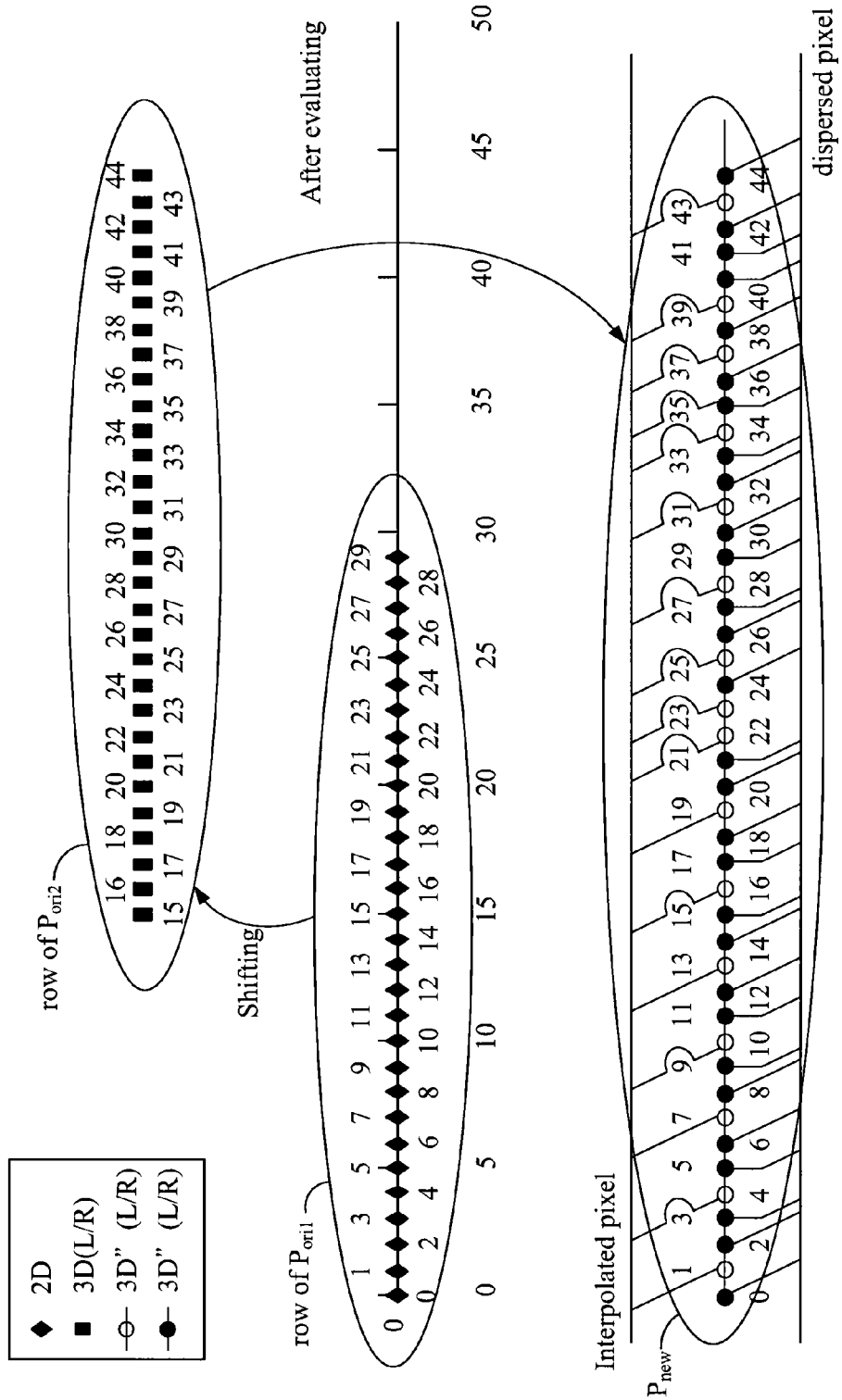
FIG. 2C shows the pixels in the scan line according to one embodiment of the present invention.

Please refer to FIG. 2A, FIG. 2B, and FIG. 2C, in which FIG. 2A shows the left eye image and the right eye image with the original scan line and the shifted scan line according to one embodiment of the present invention, FIG. 2B shows the flow chart of the method for compensating a boundary of an image according to one embodiment of the present invention, and FIG. 2C shows the pixels in the scan line according to one embodiment of the present invention.

In FIG. 2A, the left eye image is seen by the left eye of the human being, and the right eye image is seen by the right eye of the human being. Further, the original scan line of the left eye image is shifted to the right by the line shift amount, while the original scan line of the right eye image is shifted to the left by the line shift amount.

According to FIG. 2B, the method for compensating the boundary of the image first determines a boundary region for the image (step 205), and moves each pixel in a scan line from a original position to a new position within the boundary region (step 207), in which the new position is determined according to the width of the boundary region, the original position, and the line shift amount. In this embodiment, the line shift amount, the width of the boundary region, the original positions and the new positions are evaluated in pixels.

FIG. 2C and the FIG. 4 illustrate more detail about the method for compensating the boundary of the image. The new positions of the pixels are evaluated as: $P_{new}=P_{ori1}+D_{shift} \times P_{ori1} \div N$, in which $P_{new}$ represents the new position, $P_{ori1}$ represents the original position before the scan line is shifted by the line shift amount (i.e., 2D column of the FIG. 4), $D_{shift}$ represents the line shift amount (for example, 15 pixels), and N represents the width of the boundary region (for example, 30 pixels). The row of the $P_{ori1}$ (Pixel positions 0~29) is shown in FIG. 2C. In another aspect, the new position of the shifted scan line is evaluated as $P_{new}=P_{ori2}-D_{shift}+D_{shift} \times (P_{ori2}-D_{shift}) \div N$, in which $P_{ori2}$ represents the original position after the scan line is shifted by the line shift amount (i.e., 3D column of the FIG. 4). The row of $P_{ori2}$ (pixel positions 15,16,17,18,19~,44) is shown in FIG. 2C, too.

After the shifting, the pixels are dispersed on a line, and the new positions of the dispersed pixels are evaluated as $P_{new}=P_{ori1}+D_{shift} \times P_{ori1} \div N$ for example. In more detail, the new positions shown in the 3D' column of the FIG. 4 is evaluated by the equation $P_{new}=P_{ori1}+D_{shift} \times P_{ori1} \div N$ and the pixel-based positions shown in the 3D" column are obtained by rounding off the new positions shown in the 3D' column respectively. For example, the new position of the pixel labeled as 3 in the 2D column (i.e., the original position of the pixel is labeled as 3) is evaluated as 3+15*3/30=4.5 shown in 3D' column correspondingly and then the evaluated position is rounded off to 5 shown in 3D" column. In this embodiment, the position shown in 3D" column is determined as the applied new position.

Finally, certain pixels are interpolated into the scan line according to the moved pixels in order to generate a compensated image (step 209), and these interpolated pixels are generated by mixing at least two adjacent moved pixels. For example, the interpolated pixel 1 can be generated by combining the original pixel 0 and the original pixel 2. The interpolated pixel 1 can also be generated by duplicating the original pixel 0. As a result, the scan line within the boundary is formed by the dispersed pixels and the interpolated pixels as shown in FIG. 2C, and the boundary of the three dimension image is thus compensated.

FIG. 3 shows the block diagram of the video processing system according to one embodiment of the present invention. The video processing system 300 is used for compensating a boundary of an original image, in which each scan line in the original image is shifted by a corresponding line shift amount. The video processing system 300 includes a boundary detector 303, a boundary compensator 305, and a pixel interpolator 307.

The boundary detector 303 determines a boundary region for the original image 301. The boundary compensator 305 moves each pixel in a scan line from an original position within the boundary region to a new position, in which the new position is determined according to the width of the boundary region, the original position, and a line shift amount, and the scan line is shifted by the line shift amount. The pixel interpolator 307 interpolates at least one pixel into the scan line according to the moved pixels for generating a compensated image 309.

According to the above embodiments, the boundary region of the three dimensional right eye image or the three dimensional left eye image is compensated after the scan line shifting, which makes the whole three dimension image more pleasant for seeing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for compensating a boundary of a video image, wherein each scan line in the video image is shifted by a corresponding line shift amount, the method comprising:
    determining a boundary region for the video image;
    moving each pixel in a scan line from an original position to a new pixel position within the boundary region, wherein the new pixel position is determined through a boundary compensator of a video processing system according to the width of the boundary region, the original position, and a line shift amount, wherein the scan line is shifted by the line shift amount; and
    interpolating at least one pixel into the scan line according to the moved pixels for generating a compensated video image,
    wherein the new pixel position is evaluated as the following:

$$P_{new}=P_{ori1}+D_{shift} \times P_{ori1} \div N$$

Wherein $P_{new}$ represents the new position, $P_{ori1}$ represents the original position before the scan line is shifted by the line shift amount, $D_{shift}$ represents the line shift amount, and N represents the width of the boundary region.

2. The method for compensating a boundary of a video image as claimed in claim 1, wherein the line shift amount, the width of the boundary region, the original positions and the new position are evaluated in pixels.

3. The method for compensating a boundary of an video image as claimed in claim 1, wherein the at least one interpolated pixel is generated by mixing at least two adjacent moved pixels.

4. A video processing system for compensating a boundary of an image, wherein each scan line in the image is shifted by a corresponding line shift amount, and the video processing system comprises:
    a boundary detector for determining a boundary region for the image;
    a boundary compensator for, within the boundary region, moving each pixel in a scan line from an original position to a new position, wherein the new position is determined through the boundary compensator according to the width of the boundary region, the original position, and a line shift amount, wherein the scan line is shifted by the line shift amount; and
    a pixel interpolator for interpolating at least one pixel into the scan line according to the moved pixels for generating a compensated image,
    wherein the boundary compensator evaluates the new position is evaluated as the following:

$$P_{new}=P_{ori1}+D_{shift} \times P_{ori1} \div N$$

Wherein $P_{new1}$ represents the new position, $P_{ori1}$ represents the original position before the scan line is shifted by the line shift amount, $D_{shift}$ represents the line shift amount, and N represents the width of the boundary region.

5. The video processing system for compensating a boundary of an image as claimed in claim 4, wherein the line shift amount, the width of the boundary region, the original position and the new position are evaluated in pixels.

6. The video processing system for compensating a boundary of an image as claimed in claim 4, wherein the image is for left or right eye.

\* \* \* \* \*